United States Patent [19]
Leclerc et al.

[11] 4,265,541
[45] May 5, 1981

[54] INTERFEROMETRIC LASER GYROMETER

[75] Inventors: Pierre Leclerc; Claude Puech; Michel Papuchon; Pierre Lallemand, all of Paris, France

[73] Assignee: Thomson-CSF, Paris, France

[21] Appl. No.: 961,856

[22] Filed: Nov. 17, 1978

[30] Foreign Application Priority Data
Nov. 22, 1977 [FR] France .................. 77 35039

[51] Int. Cl.³ ............................................ G01C 19/64
[52] U.S. Cl. ................................ 356/350; 350/96.14
[58] Field of Search ............................. 356/350, 351; 350/96.13, 96.14, 96.17

[56] References Cited
U.S. PATENT DOCUMENTS

| | | | |
|---|---|---|---|
| 4,013,365 | 3/1977 | Vali et al. | 356/350 |
| 4,114,257 | 9/1978 | Bellavance | 350/96.14 |
| 4,120,588 | 10/1978 | Chaum | 356/350 |
| 4,133,612 | 1/1979 | Redman | 356/350 |
| 4,138,196 | 2/1979 | Redman | 356/350 |

*Primary Examiner*—Vincent P. McGraw
*Attorney, Agent, or Firm*—Cushman, Darby & Cushman

[57] ABSTRACT

The interferometric laser gyrometer according to the invention comprises a laser source, a wound monomode optical fibre an a detector, the optical coupling between the source and the two ends of the optical fibre in order that these two ends receive equal parts of the light emitted by the source contro-propagating in the fibre and the optical coupling between these two ends and the detector being effected by wave guides integrated on an electrooptical substrate at which the two ends of the fibre are rigidly coupled.

13 Claims, 7 Drawing Figures

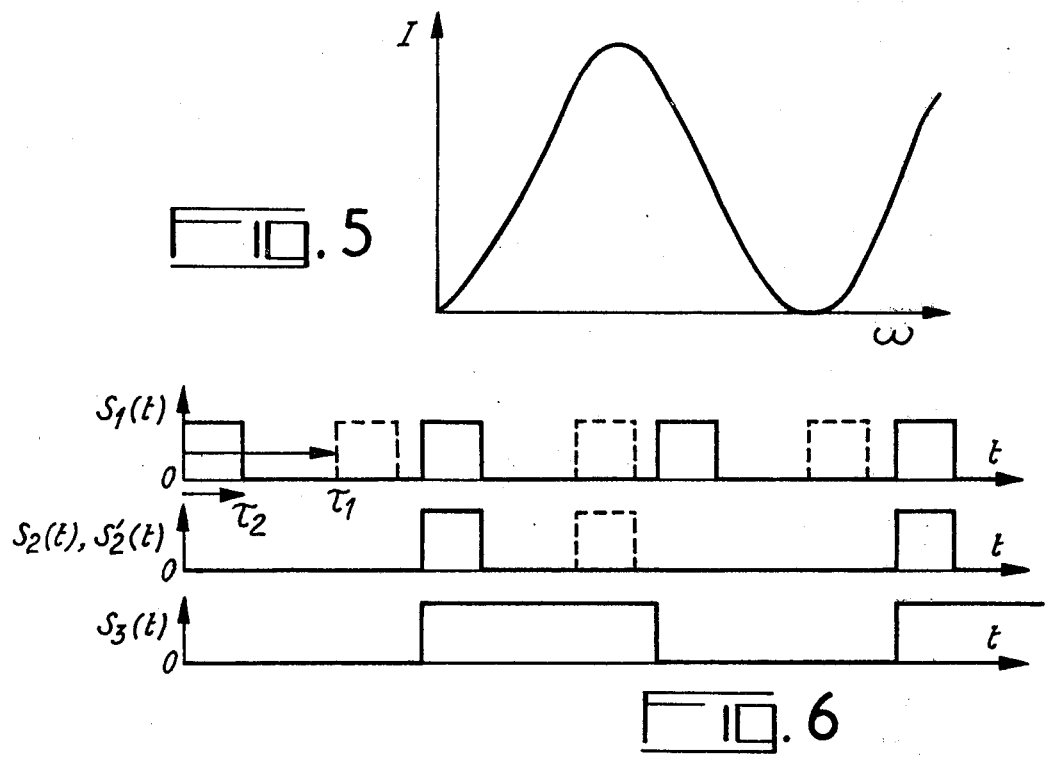
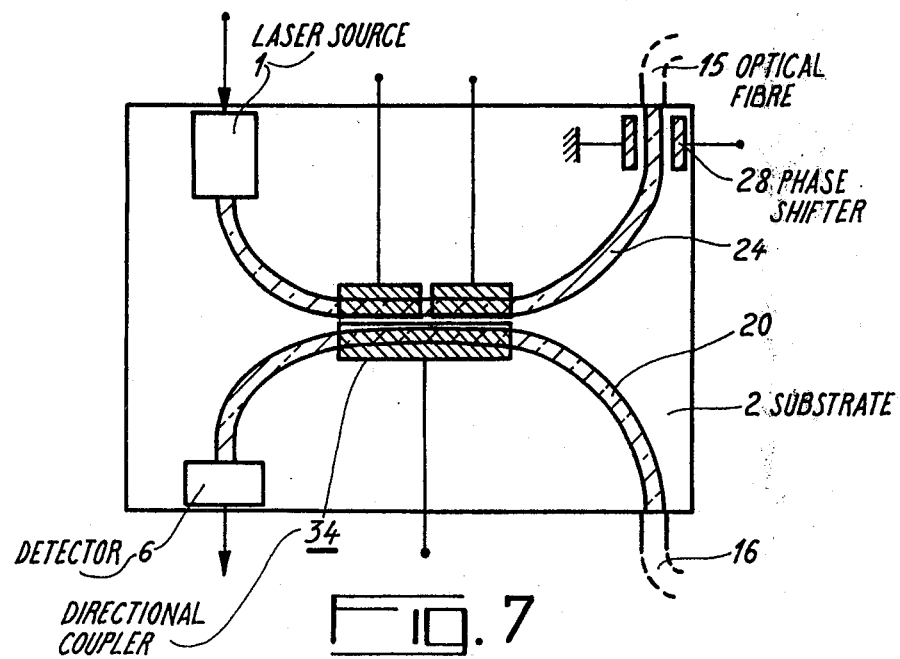

INTERFEROMETRIC LASER GYROMETER

This invention relates to an interferometric gyrometer for measuring angular speed utilising the Sagnac effect, the angular speed to be measured being determined by interferometric measurement of the phase difference between two light beams guided respectively in the direction of the rotation whose speed it is desired to measure and in the opposite direction.

Devices of this type are used in which the light beam used for measurement is divided by separating means into two beams, these two beams being respectively transmitted to the two ends of a monomode optical fibre by focussing means, this monomode fibre being wound to form a light guide comprising a certain number of turns. Devices of this type consisting of discrete elements mounted on a mobile support, lenses, beam separators and a light source for example are neither compact nor stable.

The present invention relates to an interferometric gyrometer of the type using a monomode optical fibre which does not have any of the disadvantages referred to above. In particular, the device according to the invention comprises a thin plate on which all the optical connections between the light source (laser), the detector and the two ends of the fibre are established in a completely solid medium, active functions enabling the operation of the device to be improved being capable of introduction into the optical path thus predefined.

According to the invention, there is provided an interferometric laser gyrometer comprising a monomode laser source, a wound light guide, light separating and mixing means for directing simultaneously amd in equal parts the monochromatic light emitted by the laser source towards the two ends of the light guide and for recombining the light emerging from the two ends of the optical fibre and a detector for detecting this emerging light, in which the optical connections between the emissive face of the source and the ends of the guide and the optical connections between these same ends and the detector are entirely established in a solid medium, the coupling between the ends of the guide and the ends of the optical connections being direct.

The invention will be better understood and other features and advantages thereof will become apparent from the following description in conjunction with the accompanying drawings, wherein.

Figure 3:
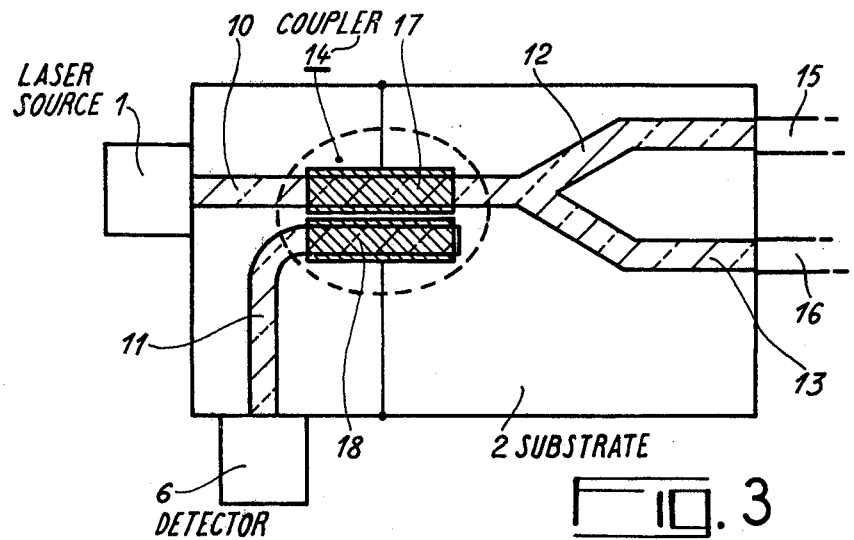
Figure 4:
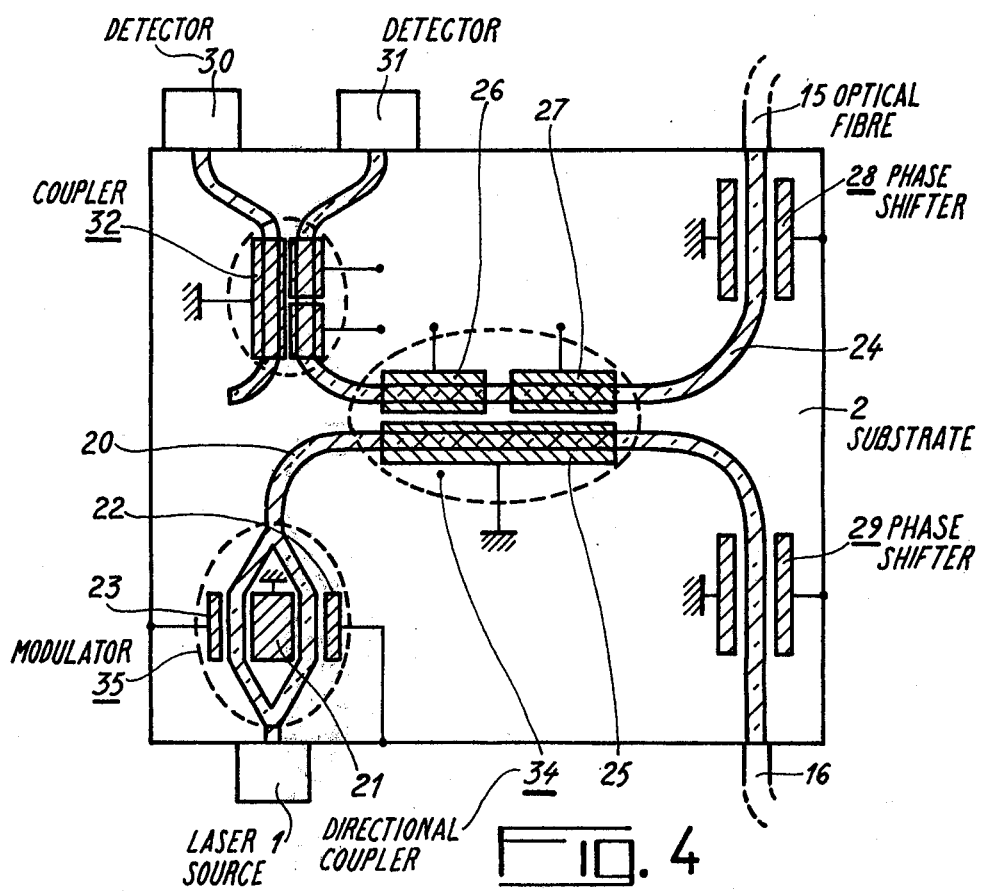

FIGS. 3 and 4 partly illustrate other improved embodiments of the device according to the invention.

FIGS. 5 and 6 show further curves explaining the operation of the gyrometer according to the invention.

FIG. 7 shows another embodiment of the gyrometer according to the invention.

As mentioned above, the effect used for measuring angular speed in interferometric gyrometers using an optical path traversed simultaneously in both directions while the device as a whole is rotating is known as the Sagnac effect. When rotated at a given speed, the Sagnac ring interferometer makes it possible to detect a difference in course between the optical path of which the direction corresponds to the direction of rotation of the interferometer and the opposite optical path.

The difference in course $\Delta L$ is expressed by the following relation:

$$\Delta L = 4S\omega/c$$

in which S is the surface area delimited by the path followed by the light in the interferometer, c is the propagation velocity of the light in the guide and $\omega$ is the angular speed of rotation. This difference in course corresponds to a phase shift between the two waves emerging from the guide $\Delta\Phi = 8\pi S\omega/c\lambda$, $\lambda$ being the wavelength of the light. If the two waves emerging from the ends of the guide are recombined into a single guide, a state of interference is established in this guide, this state being a function of the angular velocity of the interferometer. A quadratic detector collects the corresponding radiation and the signal issuing from the detector, which is characteristic of the luminous intensity I, is directly associated with the frequency of rotation.

Figure 1:
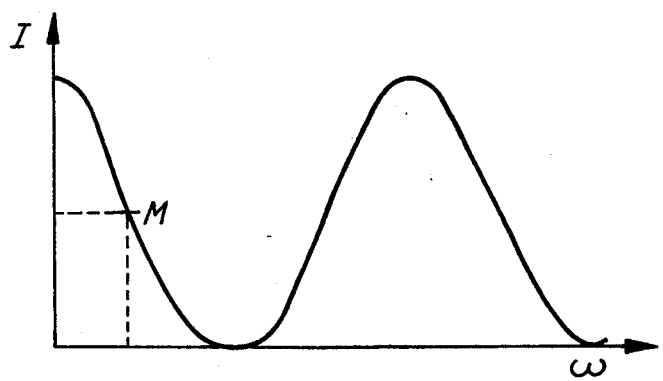
FIG. 1 is a curve explaining the operation of the device according to the invention.

The curve representing this intensity I as a function of the frequency of rotation $\omega$ is shown in FIG. 1. The formula giving the phase shift shows that the phase shift and hence the sensitivity of measurement is directly proportional to the surface area S. Consequently, this sensitivity is increased by using a long optical path. The production of monomode optical fibres introducing only minimal losses enables a fibre of considerable length to be used, the emerging radiation only being attenuated by a few decibels per kilometer for fibres of high quality and even by less than 1 decibel per kilometer (0.5 dB/km) for certain types of fibre. The length of fibre to be wound is a function of the range of speeds to be measured. For relatively high speeds, a length of a few meters may be sufficient to obtain a difference in course giving rise to a state of interference capable of being detected.

If the system is to enable suitable measurements to be carried out with low-intensity radiation, it is necessary for the conditions under which the radiation is transmitted between the emissive face of the laser source and the ends of the fibre on the one hand and between the ends of the fibre and the radiation detector on the other hand to be suitable. The device according to the invention enables the propagation conditions to be optimised on the one hand by making the connections rigid, the radiation being guided on solid guides to avoid dispersion, and on the other hand by integrating them on one and the same substrate to eliminate any relative variation in the positioning of the elements and, finally, by enabling these connections to be electrically controlled without difficulty, phase modulators, amplitude modulators or even filters and resonators being able to be readily introduced into the optical path. In addition, the source and the detection means may be exactly adapted to the corresponding integrated guides.

Figure 2:
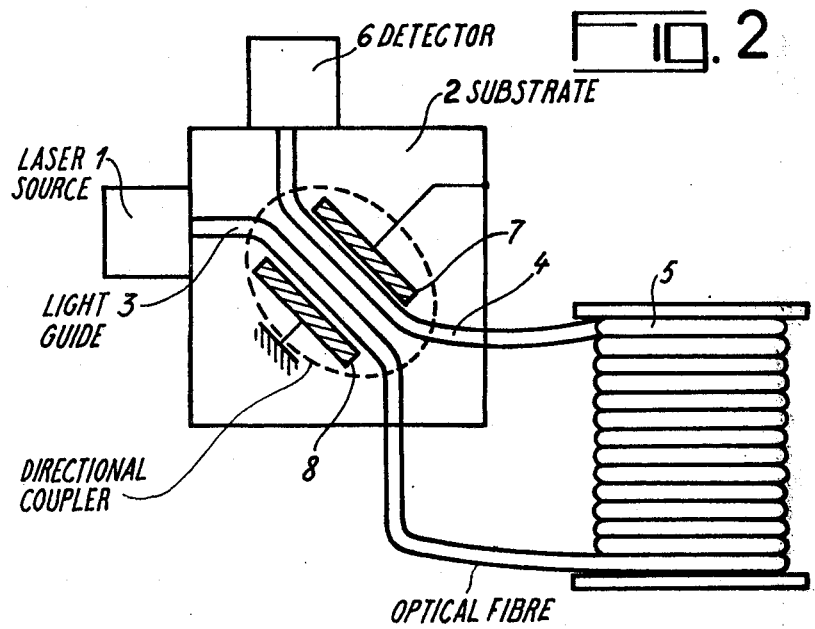
FIG. 2 shows a first simple embodiment of the device according to the invention.

FIG. 2 shows a first embodiment of the interferometric laser gyrometer according to the invention. The gyrometer comprises a laser source 1 which may be a gas laser, for example helium-neon, a semiconductor laser (Ga As) or a solid laser. The laser selected, preferably has a wavelength corresponding to an absorption minimum for the optical fibres, i.e around 0.85 $\mu$m or around 1.2 $\mu$m. The emissive face of this source 1 is coupled with the end of a solid light guide 3 formed on a substrate 2. This substrate may be an electrooptical substrate, for example a thin plate of lithium niobate $LiNbO_3$ or lithium tantalate $LiTaO_3$. The light guides may be obtained on substrates such as these by the diffusion of metal ions (titanium and niobium, respectively). In this embodiment, the optical circuit integrated on this substrate only comprises a directional coupler controlled by two electrodes 7 and 8 between which an electrical field may be applied.

This directional coupler is formed by the guide 3 and a guide 4 which are parallel to one another over part of their length, being separated by a predetermined interval. When an electrical field is applied between the electrodes, the index of the electrooptical material varies and the control by the electrical field enables the light guided by one guide to be completely or partly transferred to the other guide. The other end of the guide 3 and one end of the guide 4 are coupled with the two ends of a wound optical fibre 5, the second end of the guide 4 being coupled with the receiving face of a light detector 6. A device such as this operates as follows: the coupler is used as a light separator and as a mixer. A control signal enables light to be emitted by the laser. The field applied between the electrodes of the coupler is such that half the light is transferred from the guide 3 to the guide 4. Accordingly, the two ends of the fibre 5 receive half the energy and the fibre is traversed by the light (simultaneously in both directions). The coupling between the two guides is such that the two return waves interfere. The detector situated at the end of the guide 4 thus receives a signal I which is a function of the rotational speed of the system. Although a device of the type in question operates continuously, it may also be made to operate on the pulse principle, in which case the laser only emits for a period shorter than the propagation time in the fibre. In this way, detection takes place in pulses.

FIG. 3 shows a second example of a thin plate. As in FIG. 2, the device comprises a laser source 1, preferably a semiconductor laser.

In the same way as before, the thin plate 2 is an electrooptical substrate on which wave guides may be formed. The optical connections integrated on the substrate are a first guide 10 picking up the radiation emitted by the laser, a second guide 11 which forms a coupler 14 with the first guide 10 and a symmetrical bifurcation formed by two guides 12 and 13 which are coupled with the guide 10 and which are respectively intended to pick up half the radiation guided by the guide 10. A quadratic detector 6 is coupled with the end of the guide 11 and the two ends 15 and 16 of the monomode optical fibre (not shown) are coupled with the ends of the guides 12 and 13. The coupler 14 formed by the two adjacent parts of the guides 10 and 11 may be placed either in a parallel state, in which case the light guided in the guide 10 emerges by the same guide, or in a crossed state, in which case the light guided in the guide 10 is coupled in the guide 11. To this end, two electrodes 17 and 18, between which an electrical field $\vec{E}$ may be applied, overlap the parallel optical paths formed by the two adjacent parts of the guides 10 and 11. In the absence of the field, the coupler is in the parallel state whilst, in the presence of the field, it is in the crossed state. The field is applied during the return of the light.

The device thus operates as follows:

The laser source 1 is modulated to emit light pulses shorter in duration than the propagation time in the fibre. The coupler is in the parallel state during the emission of the light pulses so that the light emitted by the laser is guided in the guide 10. The energy is separated equally between the two guides 12 and 13 and is transmitted to the fibre where it is simultaneously propagated in both directions. If the system is rotating at the angular speed ω, the two return pulses will be transmitted respectively to the guides 12 and 13 with a phase shift ΔΦ. The coupler is then placed in the crossed state by the application of an electrical field and the light combined by the guide 10 is transmitted to the guide 11 and detected by the detector 6, the luminous intensity detected being directly associated with the angular speed ω. The precision of the measurement is determined by the signal-to-noise ratio of the system.

FIG. 4 shows another embodiment of the gyrometer according to the invention, amplitude and phase modulators being provided in the various branches of the means for separating and recombining the light so that the speed measurement is more precise.

More particularly, the gyrometer shown in FIG. 4 comprises a laser source 1 which permanently emits a light beam. The pulse modulation of the light transmitted to the optical fibre 5 is effected by an interferometric modulator 35. The light guide 20 coupled with the emissive face of the source is separated into two guides, these two guides being subsequently recombined. A system of three electrodes, of which a central electrode 21 is at earth potential and two lateral electrodes 22 and 23 at variable potentials $V_1$ and $V_2$, enables an electrical field to be applied to the electrooptical material, inducing a variation in the index of that material. Since the two recombined waves have a difference in course, a state of interference is created. If the two waves are in phase, all the light emitted by the source is transmitted, but the difference in course may be adjusted in such a way that no light is transmitted. When light is transmitted by the guide 20, it is partly transferred to a guide 24 by a directional coupler 34 formed by two parallel parts of the guides 20 and 24 separated from one another by a predetermined distance.

In this case, the control system of the coupler is formed by three electrodes, one 25 covering the entire coupling path of the guide 20 and the two others 26 and 27 covering half the coupling path of the guide 24. The electrode 25 is at earth potential whilst the electrodes 26 and 27 are respectively at two opposite potentials +V and −V. A structure such as this enables all the light to be coupled in one guide or the other or to be divided between the two guides. In the device illustrated, the function performed by the coupler is also to divide the radiation between the two guides during emission of the radiation and to mix this radiation coming from the two ends of the fibre during return of the light. The two fractions of the radiation issuing from the coupler are guided by the guides 20 and 24 and are transmitted to the two ends 15 and 16 of the wound optical fibre. The winding has not been shown in this figure. Phase shifters 28 and 29 have been provided at the ends of the guides 20 and 24. These phase shifters are formed by two electrodes of which one is at earth potential whilst the other is capable of being brought to a variable potential. These phase shifters are controlled on the pulse principle for phase shifting part of the radiation relative to the other by an additional quantity (in addition relative to the phase difference due to the rotation) so as to shift the point of operation of the device on the curve shown in FIG. 1. Thus, where provision is made for an additional phase shift equal to $\pi$ between the two channels, the intensity of the radiation received by the detector as a function of the angular speed ω is that shown in FIG. 5.

A device such as this enables a zero intensity to be obtained at zero speed. Other operating conditions may also be envisaged, for example by allowing an additional phase shift of $\pi/2$ between the two channels. This is because, in that case, the point of zero speed is situated at the point of inflection M of the preceding curve (FIG. 1) and, for a range of speeds in the vicinity of the zero speed, the slope of the curve is maximal and the response substantially linear. Accordingly, operating conditions such as these provide for direct standardisation. A third mode of operation may be used and the device shown in FIG. 4 is particularly adapted to this mode of operation. After having passed through the fibre, the luminous return beam is mixed in the coupler 34 formed by the electrodes 25, 26 and 27 associated with the electrooptical material and with the branches of the guides adjacent these electrodes. This light beam issuing from the coupler by the guide branch 24 is detected either by the detector 30 or by the detector 31. To this end, a coupler 32 of the same type as the coupler responsible for coupling the guides 20 and 24, i.e. comprising three electrodes, enables the light issuing from the guide 24 to be completely directed either towards the detector 30 or towards the detector 31, depending on the control signal applied. The control signals of the coupler 32 are in synchronism with the phase-shift control signals.

When no additional phase shift is introduced between the two channels by the phase shifters 28 and 29, the coupler 32 is adjusted for the radiation which is then $I_1$ to be detected by the detector 30 whereas, when a phase shift of $\pi$ is introduced between the two channels, the coupler 32 is adjusted for the radiation which is then $I_2$ to be detected by the detector 31. It is also possible to provide only a single detector and alternately to measure $I_1$ and $I_2$. The phase shift is applied every second period solely during the return (or solely during the emission) of the radiation so that only a fraction of the radiation undergoes the phase shift. The measurements alternately effected on one and the other of the detectors correspond to $I_1 = I_0 \cos^2 \Phi$ and $I_2 = I_0 \sin^2 \Phi$. In this case, the value of the speed is obtained by combining these two measurements for deducing the value of $tg^2 \Phi$ and hence the value of $\Phi$. A double measurement such as this enables the effect of variations in the output power of the laser to be overcome because the speed is obtained without this value of the output power affecting the calculation. The curves shown in FIG. 6 represent the time diagram of the control signals applied to the modulator 35 $S_1$ (t), to the phase shifter 29 and 28, $S_2$ (t) or $S'_2$ (t) (in dotted lines), and to the output coupler 32, $S_3$ (t). $\tau_1$ is the time taken by the luminous radiation to pass through the wound optical fibre, $\tau_2$ is the duration of the pulse. The pulses shown in dotted lines in the same axis as $S_1$ (t) represent the envelope of the signal coming from the fibre. The control signals $S_2$ (t) and $S'_2$ (t) respectively correspond to a phase shift applied to the radiation before or after its passage through the fibre. In the drawing, one phase shifter has been shown in each branch to afford the possibility of phase shifting one or other of the two parts of the radiation, although one only of these phase shifters may effectively operate for one period of operation.

FIG. 7 shows a device somewhat similar to that shown in FIG. 4, except that all the elements apart from the optical fibre itself have been integrated on the same electrooptical substrate, particularly the laser 1 and the detector 6. For this embodiment, the laser 1 may be a gallium arsenide (Ga As) laser of which the active layer comprises aluminium and which emits radiation having a wavelength of the order of 0.85 $\mu$m or a solid laser constructed from a crystalline material, for example lithium niobate, doped with active ions of neodymium $Nd^{3+}$. In this latter case, the optical pumping effect is controlled by an electroluminescent diode, for example of Ga As, and the laser emits a beam having a wavelength of 1.06 $\mu$m.

The laser may also be constructed from a substrate on InP, the active layer being a layer of GaInAs. Lasers of this type, which are currently being perfected and which may be produced more easily than Ga As lasers emit at around 1.2 $\mu$m. Now, the attenuation of the fibres, which reaches a first minimum for radiation wavelengths of the order of 0.85 $\mu$m, reaches a second minimum for wavelengths of the order of 1.2 $\mu$m lower than the first (a factor of 2 in the reduction of attenuation). Accordingly, sources such as these are particularly suitable for the production of an interferometric gyrometer according to the invention.

Similarly, the detector 6, which may be a PIN photodiode or an avalanche diode, may also be integrated on the substrate. The other elements of the device are similar to those illustrated in FIG. 4 and include in particular the substrate 2, the guides 20 and 24, the coupler 34, the phase shifter 28 and the fibre 5 (partly shown). The device operates in the same way as the device shown in FIG. 3 either continuously or on the pulse principle, the pulse control being directly effected by the laser. In this embodiment, the phase shifter 28 is only used for adjusting the point of operation and a single detector 6 is provided, collecting the radiation mixed by the coupler 10. The circuits mentioned above are produced by integrated optics, i.e in the form of monolithic thin-layer structures, the layers in question being obtained by deposition, diffusion and etching.

Devices of this type enable good results to be obtained in regard to the sensitivity of measurement. This sensitivity may be of the order of $10^{-9}$ rd/s. Two examples of the results obtained are given hereinafter, the characteristics of the various elements having been selected in dependence upon the range of speeds to be measured.

For measuring a low angular speed, a high-quality fibre having an attenuation of 5 dB/km and a length of two kms, wound onto a drum 15 cm in radius and using a laser emitting a 1 mW beam, the detector having a band of 10 Hz, enabled a speed of $2 \times 10^{-8}$ rd/s to be measured. For higher speeds, the laser source may be weaker, for example 0.01 mW, the fibre may be of average quality (attenuation of the order of 10 to 100 dB/km) for a length of 5 m and the detector may detect up to 100 Hz. A gyrometer having characteristics such as these enables an angular speed of $7 \times 10^{-5}$ rd/s to be measured. Higher angular speeds may be measured by counting interference fringes. Thus, an angular speed of 25 t/s corresponds to a counting of 1100 fringes, one fringe corresponding to 8.3 deg/s.

The invention is by no means limited to the embodiments specifically described and illustrated. In particular, an interferometric laser gyrometer in which the optical connections between the emissive face of the source and the ends of a wound optical fibre on the one hand and the optical connections between these same ends of the fibre and a detector on the other hand are entirely established by guide in a solid medium, the guides being obtained by the diffusion of metal ions into an electrooptical substrate, is included in the scope of the invention.

Circuits of the type in question may also enable a measurement of speed to be made by a zero method in which the phase shifter is subordinated to the detector.

By measuring the variation of intensity in the detector and by applying to the control electrodes of the phase shifter a complementary voltage proportional to the error signal corresponding to these variations in intensity, the detected signal is kept constant (at the selected point of operation). The total voltage required is thus directly related to the angular speed of rotation $\omega$.

The scope of the invention also includes a gyrometer in which the light guide simultaneously traversed in both directions is not a wound optical fibre, but a light guide which is also integrated onto a thin plate forming an extension of the guides previously used for the connections, the guide integrated on the thin plate being in the form of a spiral.

What we claim is:

1. An interferometric laser gyrometer comprising a laser source having an emissive face, a wound light guide having two end faces, detection means having a receiving face, and an integrated optical circuit formed on a solid substrate and having four ports, said ports having further faces in straight abbutal with said faces; said integrated circuit comprising integrated waveguide means for interconnecting said four ports; said laser source supplying radiant energy to said end faces, and said detection means being fed with the sum of radiant energies emerging from said end faces; said integrated waveguide means comprising directional coupler means for preventing radiant energy emerging from said end faces from interfering with energy supplied by said laser source.

2. An interferometric laser gyrometer as claimed in claim 1, wherein said integrated optical circuit is formed on an electro-optical substrate, said directional coupler means having at least one electrical control input.

3. An interferometric laser gyrometer as claimed in claim 1 or 2, wherein said directional coupler means comprise a 3 dB directional coupler, having ports; two of said ports being ports of said 3 dB directional coupler respectively connected to said two end faces.

4. An interferometric laser gyrometer as claimed in claim 2, wherein said directional coupler means is a switch type directional coupler having one port in common with an integrated bifurcated waveguide section; the further two ports of said integrated bifurcated waveguide section being respectively connected to said two end faces.

5. An interferometric laser gyrometer as claimed in claim 1, wherein said waveguide means are made of portions of said substrate having a refractive index higher than that of portions surrounding said portions.

6. An interferometric laser gyrometer as claimed in claim 1, wherein said wound light guide is a monomode optical fiber.

7. A gyrometer as claimed in claim 1, wherein said laser source is integrated on said substrate.

8. A gyrometer as claimed in claim 1, wherein said detection means are integrated on said substrate.

9. An interferometric laser gyrometer as claimed in claim 2, further comprising modulating means for modulating light emerging from said source to emit pulses of light towards said two end faces; the duration of said pulses being shorter than the time of transit of the light along the full length of said wound light guide, the period of said pulses being at least equal to the sum of said duration and said time of transit.

10. An interferometric laser gyrometer as claimed in claim 9, further comprising integrated phase shifter means provided in the path of the light between said directional coupler and one end face of said wound guide, said phase shifter means being electrically controlled for introducing a pulsed additional phase shift between the fractions of the light circulating forth and back along said wound guide.

11. An interferometric laser gyrometer as claimed in claim 10, wherein said phase shifter means impart to one of said fractions an additional phase shift taking a first value 0 within one of said periods and a second value $\pi$ within the next one of said periods; said detections means comprising two detectors, a further electrically controlled integrated directional coupler being disposed between said directional coupler and said two detectors; said further electrically controlled integrated directional coupler being switched at synchronism with said phase shifter means.

12. An interferometric laser gyrometer as claimed in claim 10, wherein said phase shifter means impart an additional phase shift of $\pi/2$ between the two fractions of light.

13. An interferometric laser gyrometer as claimed in claim 9, wherein said modulating means are formed by an integrated amplitude modulator arranged between said emissive face of the source and said directional coupler means.

* * * * *